March 9, 1954  C. FARROW  2,671,862
DETECTOR HEAD FOR SONIC INSPECTION DEVICES
Filed Jan. 11, 1949
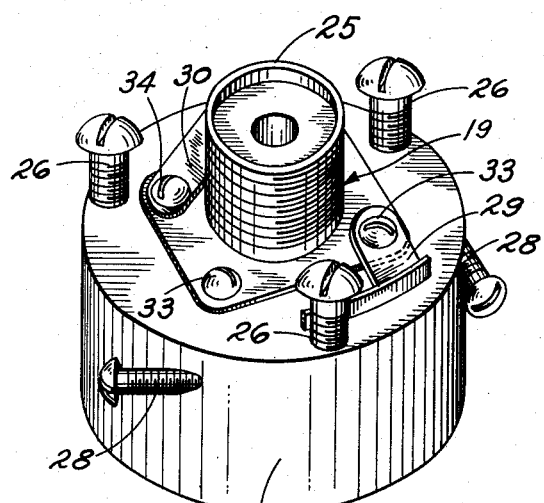
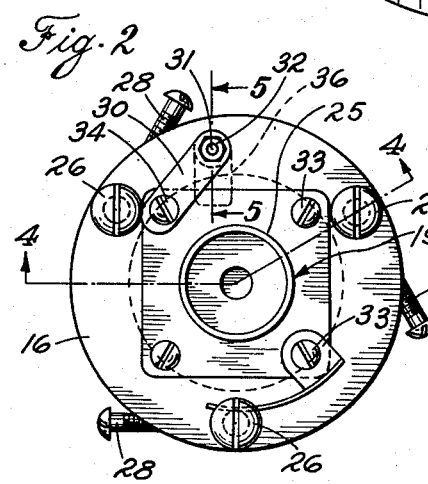
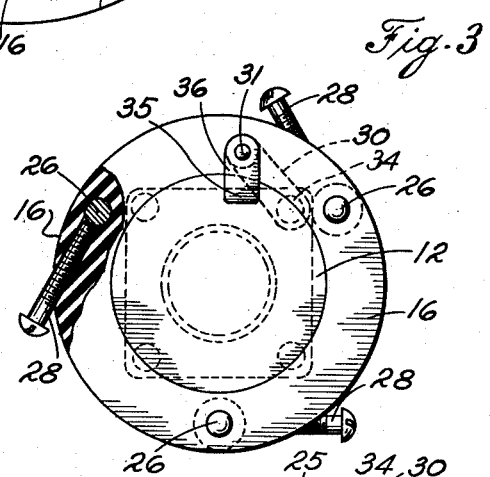
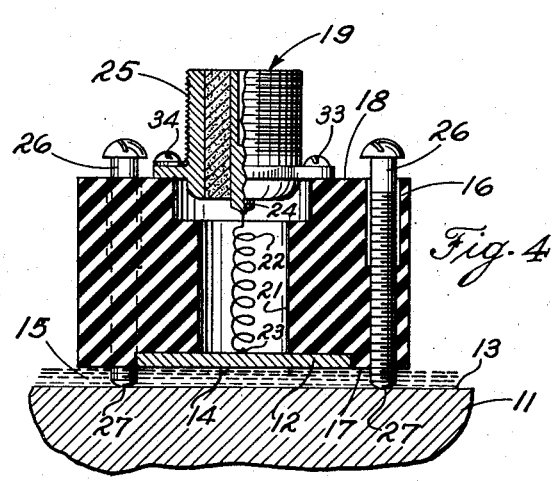
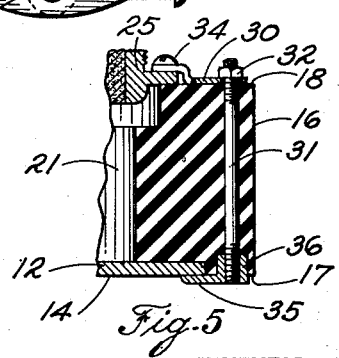
INVENTOR.
CECIL FARROW
BY *Richey + Watts*
ATTORNEYS

UNITED STATES PATENT OFFICE 2,671,862

DETECTOR HEAD FOR SONIC INSPECTION DEVICES

Cecil Farrow, Bainbridge Township, Geauga County, Ohio, assignor to Republic Steel Corporation, Cleveland, Ohio, a corporation of New Jersey Application January 11, 1949, Serial No. 70,231

1 Claim. (Cl. 310—8.2)

The present invention relates to supersonic flaw detection and concerns particularly detector heads or exploring units for Reflectoscopes.

Metallic articles of various shapes and sizes, especially steel pieces with relatively smooth ground surfaces, have been tested by means of supersonic waves for locating defects such as "pipes, bleeding," etc. Such methods are described in the papers presented by Messrs. Desch, Sproule, and Dawson, before The Iron and Steel Institute at London, received February 19, 1946, entitled "The Detection of Cracks in Steel by Means of Supersonic Waves," Paper No. 17/1946 of the Alloy Steels Research Committee (submitted by the Hair-Line Crack Sub-Committee). Various forms of supersonic test apparatus are known and are commonly termed "Reflectoscopes" in the art. Quartz piezo-electric crystals are employed in such supersonic test apparatus as transmitting and receiving transducers and transceivers. The piezo-electric crystals are held against the surface of the specimen to be tested with a film of oil, glycerin, or other liquid serving in effect to form a continuous sound-transmitting medium from the crystal to the specimen being tested. Separate heads for transmitting and receiving the supersonic signals or vibrations may be provided, or a single head may be employed as a transmitting and receiving detector or transducer, as described in Firestone Patent #2,280,226.

It is an object of the invention to provide an improved more easily used exploring unit or detector head which does not necessitate that the liquid film between the crystal surface and the specimen surface be very thin.

A further object of the invention is to enable tests to be made very quickly and signals to be obtained immediately upon placing the exploring unit against the samples.

A further object is to avoid the need for rubbing the crystal down into the oil film in order to make good contact with the specimen surface where the surface may be rough or covered with mill scale, for example.

A further object is to avoid wear on the crystal such as would occur in endeavoring to make good contact between a crystal and a specimen having a surface lacking smoothness or flatness.

Still another object of the invention is to enable the tests to be made upon cast steel parts and other parts having rough surfaces, as well as parts having curved surfaces or other surfaces.

Other and further objects, features and advantages of the invention will become apparent as the description proceeds.

In carrying out the invention in accordance with a preferred form thereof, a piezo-electric crystal is held a predetermined distance from the surface of the specimen to be tested and a relatively thick layer of some liquid is provided between the crystal and the specimen. The crystal is held parallel to the specimen surface and the spacing is maintained at a constant predetermined value. Preferably the spacing is approximately equal to a half-wave length or an integral number of times one-half the wavelength of the vibrations employed in carrying out the supersonic tests. The wavelength referred to is the wavelength in the liquid. A detector head may be provided which is in cylindrical form with a piezo-electric crystal mounted on one surface or base thereof and spacing lugs projecting through the same surface of the exploring unit for fixing the spacing between the outer surface of the piezo-electric crystal and the specimen surface.

A better understanding of the invention will be afforded by the following detailed description considered in conjunction with the accompanying drawing, in which:

Fig. 1 is a perspective view of a detector head forming an embodiment of my invention;

Fig. 2 is a top view of the apparatus of Fig. 1;

Fig. 3 is a bottom view of the apparatus of Fig. 1;

Fig. 4 is a diagram illustrating the method of carrying out the invention and showing a broken cross-section of the apparatus of Fig. 2 as represented by the broken line 4—4; and Fig. 5 is a fragmentary cross-sectional view illustrating an alternative connection.

Referring to Fig. 4, in testing a specimen such as a fragmentarily represented steel slab 11 for flaws, a piezo-electric crystal 12 is held parallel to and a fixed distance from the surface 13 of the specimen 11. Electrical signals of supersonic frequency are applied to the crystal 12 for causing it to vibrate transverse to the surface 14. These vibrations are transmitted through a film 15 of a suitable liquid, such as glycerin or oil, to the specimen 11. The presence of any defect in the specimen 11 is revealed by reflections of a signal back to the surface 13 and through the oil film 15 to the piezo-electric crystal 12. The reflected signals set the crystal 12 in vibration which sets up voltage signals which are detected by suitable electronic instruments, not shown.

Reflectoscopes or supersonic testing equipments used in piezo-electric crystals have high frequency generators, the frequency of which may be adjusted according to the nature of the flaw to be located. For each such frequency there is a predetermined wave length of the signals passing through the liquid film 15, and the piezocrystal 12 is preferably held at such a distance from the specimen surface 13 so that the spacing equals an integral number of times this half-wave length.

For example, when testing at a frequency of 2¼ megacycles per second, and using glycerin as the liquid, the half wave length comes out at slightly under .017 inch. It has been found in tests that this value of .017 inch can be deviated from by at least .005 or .006 inch in either direction without serious decrease in sensitivity.

In order to enable the test to be performed quickly and easily and to assure that the crystal 12 will be held at a constant distance from the specimen surface 13, an exploring unit or detector head, such as illustrated in the drawing, is employed. As illustrated, the exploring unit comprises a cylindrical body 16 having a base or lower face 17 recessed to receive the piezo-electric crystal 12 and an upper face 18 upon which is mounted a conventional type of coaxial or concentric line connector 19. The body 16 is provided with a bore 21 enabling a conductor 22 to be connected between the back face 23 of the crystal 12 and the center conductor 24 of the coaxial connector 19. It will be understood that such a connector 19 also includes an outer or cylindrical conductor 25 threaded to receive a suitable fitting, not shown, at the end of a cable of the conventional type employed for transmitting the electrical impulses to the Reflectoscope head and receiving the reflected signals.

In order to fix the spacing between the surface 14 of the piezo-electric crystal 12 and the surface 13 of the specimen 11, spacing lugs 26 are provided. Preferably, the spacing lugs 26 have spherical or conical points to form bearing points 27 adapted to rest upon the surface 13 of the specimen 11. In order that the spacing between the plane of the bearing points 27 and the plane of the crystal surface 14 may be adjusted when different fluids are used having different speeds of transmission, or when the transmitting frequency of the Reflectoscope is altered, the lugs 26 are made adjustable. For example, they may be in the form of machine screws threaded through suitable tapped openings in the body 16. Preferably there are three such machine screws so as to provide three-point contact with any specimen surface whether or not the surface of the specimen is a true plane. If desired, lock screws 28 may also be provided for retaining the adjusting screws 26 in the positions at which they had been set. The body 16 may be composed of a suitable insulating material such as a polymerized phenol formaldehyde or other phenolic condensation product.

Usually the specimen 11 is connected to ground and the Reflectoscope is effectively grounded either by direct connection or by stray capacitance. However, for some testing, it may be necessary to provide for a connection from fitting 19 to the sample 11. This may be done through one of the lugs 26 by connecting this lug to fitting 19 by means of a spring 29. One end of spring 29 is provided with a hole into which screw 33 is inserted. At the other end of spring 29 there is again the lug 26 as shown in Fig. 2. An alternative method of providing for connection to the face 14 of crystal 12 is also shown. A connecting strap 30 has one end placed under the screw 34. The other end of connecting strap 30 is placed under a nut 32 on connecting screw 31. The other end of connecting screw 31 is screwed into a fitting 36 which is provided with a spring tip 35. Fitting 36 is preferably soldered in place on connecting screw 31. When this method of grounding is used, the lower face 14 of crystal 12 should be coated with some conducting material such as silver or gold as is well known in the art. It is not intended that these methods should both be used at the same time, although there is no objection to doing so. The use of strap 30 and connecting screw 31 with nut 32 and fitting 36 provides somewhat better sensitivity because it applies the electrical voltage directly to the surface 14 on the crystal 12. However, I have found that for most purposes sufficient sensitivity is obtained by applying the voltage of the supersonic pulse between the upper surface of crystal 12 and a sample 11.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention, the scope of which is set forth in the annexed claim.

What is claimed is:

An exploring head for applying supersonic test signals to work pieces having relatively rough outer surfaces comprising a unitary body member of insulating material and having a top and a bottom end, a crystal having an upper and a lower face received in a recess in the bottom end of the said body member, means carried by the body member for supporting the crystal in the recess, a connector mounted at the top end of said member having two terminal parts, a conductor electrically connected to one of the said terminal parts and to the upper face of said crystal, a conductor electrically connected to the remaining one of the said terminal parts and to the lower face of said crystal and means for engaging the work piece and holding the crystal in spaced relation with respect to the work piece comprising three screw members extending through the body member in threaded engagement therewith and projecting beyond the bottom end of the body member, whereby the screw members may be adjustably positioned so that the plane of the ends of the members is spaced from the lower face of the crystal a distance substantially equal to an integral number of half wave lengths of the supersonic signals while accommodating a liquid film between the lower face of the crystal and the work piece.

CECIL FARROW.

References Cited in the file of this patent

UNITED STATES PATENTS

| Number | Name | Date |
|---|---|---|
| 2,274,466 | Atwood | Feb. 24, 1942 |
| 2,283,285 | Rohlman | May 19, 1942 |
| 2,323,030 | Gruetzmacher | June 29, 1943 |
| 2,431,233 | Erwin | Nov. 18, 1947 |
| 2,458,581 | Firestone et al. | Jan. 11, 1949 |
| 2,479,264 | Rosenberg | Aug. 16, 1949 |

OTHER REFERENCES

"Sheet Fractures Detected With Supersonics," The Iron Age, June 8, 1944, pages 60–61.